United States Patent [19]
Taylor et al.

[11] 3,868,324
[45] Feb. 25, 1975

[54] WATER INTAKE AND FISH RETURN SYSTEM

[75] Inventors: Robert F. Taylor, Milwaukee; Donald A. Strow, Hales Corners; Hosein Mansouri, New Berlin, all of Wis.

[73] Assignee: Envirex Inc., Waukesha, Wis.

[22] Filed: Dec. 22, 1972

[21] Appl. No.: 317,587

[52] U.S. Cl............. 210/158, 210/160, 210/328, 61/21, 210/333, 210/400
[51] Int. Cl.................. Fo2b 8/08, B01d 33/02
[58] Field of Search........... 210/153, 162, 242, 328, 210/333, 400; 119/3, 20, 14.03; 61/21

[56] References Cited
UNITED STATES PATENTS

| | | | |
|---|---|---|---|
| 1,514,673 | 11/1924 | Roddy | 210/400 X |
| 1,967,050 | 1/1932 | Brackett | 210/160 |
| 3,093,580 | 6/1963 | Siewert | 210/162 X |
| 3,246,631 | 4/1966 | Holm | 119/14.03 |
| 3,377,805 | 4/1968 | Warner | 61/21 |
| 3,508,659 | 4/1970 | Bates et al. | 210/160 |
| 3,563,380 | 2/1971 | Thomas | 210/242 X |
| 3,820,342 | 6/1974 | Stipanov | 61/21 |

FOREIGN PATENTS OR APPLICATIONS
319,068  9/1929  Great Britain ............ 210/160

Primary Examiner—Roy Lake
Assistant Examiner—Craig R. Feinberg
Attorney, Agent, or Firm—Sughrue, Rothwell, Mion, Zinn & Macpeak

[57] ABSTRACT

A travelling water screen unit comprises an endless series of pivotally interconnected rectangular screens. Each screen comprises a frame having ends attachable to corresponding links of parallel chains and a grille having upright bars which are spaced just sufficiently closely to divert the fish swimming or being carried in the flow. The larger debris carried by the flow in the channel is intercepted by the screens moving upwardly therein and is removed by backwash sprays from the screens approaching the upper drive and support means above the channel. Such units and their intermediate support columns are set flush and in a straight row but at a sharp angle in the order of 30° respecting the approaching flow so that fish are diverted toward the end of the row and into a fish receiving channel from which they are periodically returned to the natural watercourse.

4 Claims, 5 Drawing Figures

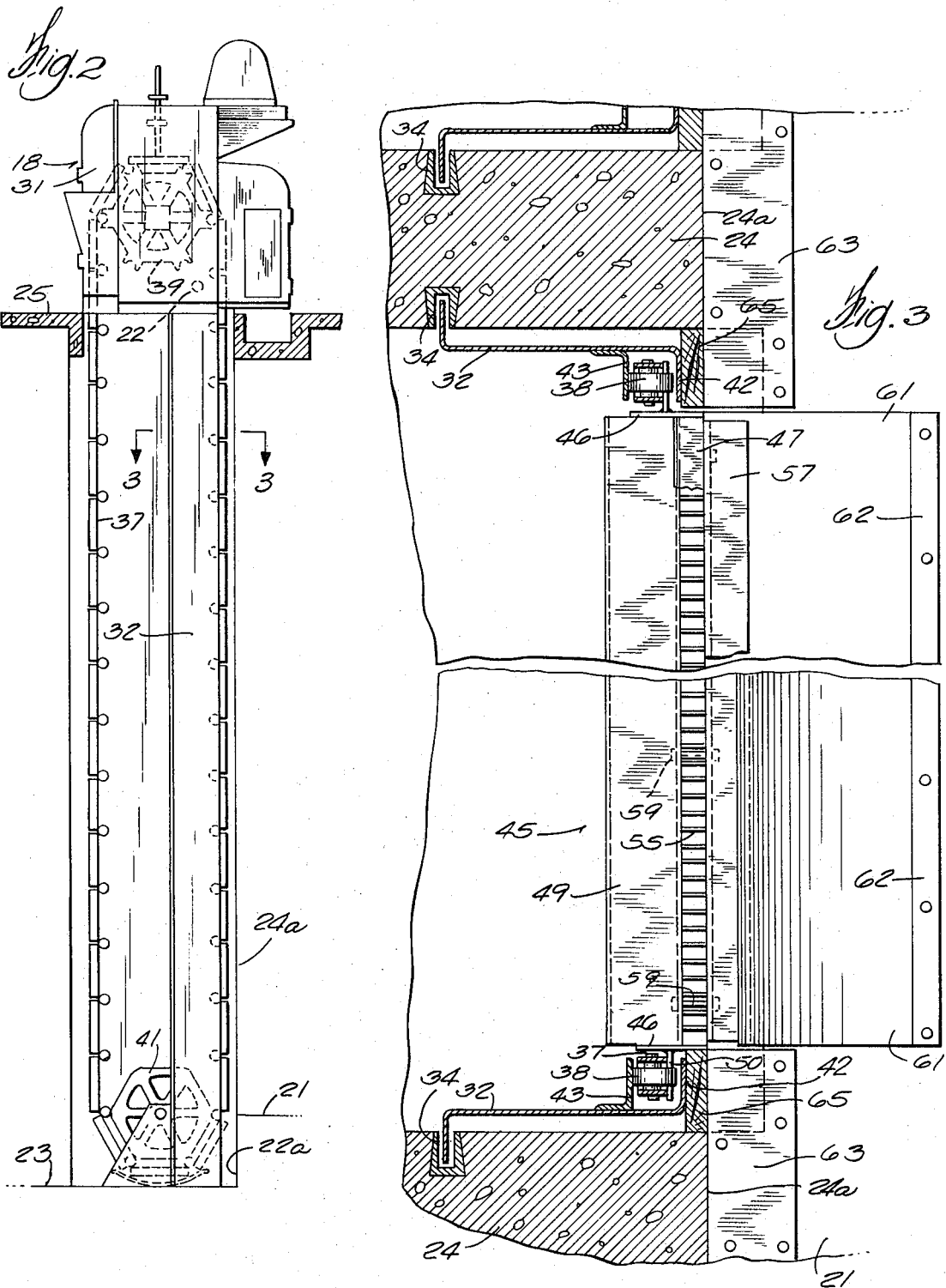

WATER INTAKE AND FISH RETURN SYSTEM

CROSS REFERENCE TO RELATED APPLICATION

The construction of the screens of the travelling water screen unit is the subject of copending application entitled Improved Screens for Water Intake Systems, Ser. No. 317,841 and filed Dec. 22, 1972, by the present inventors.

BACKGROUND OF THE INVENTION

1. Field of the Invention a) Flume type endless belt strainer; Endless conveying element structure; Fish Culture.

2. Prior Art

The lower section of a typical travelling water screen is shown in U.S. Pat. No. 2,286,332. A typical travelling water screen for the removal of debris but which includes also provision for the removal and saving of the fish, is shown in U.S. Pat. No. 2,851,162. U.S. Pat. No. 3,508,659 shows a unique screen which is principally for the removal of the fish from a stream and incidentally or necessarily provides for the removal of debris.

SUMMARY OF THE INVENTION

The water intake structure is located alongside a natural watercourse. A number of travelling water screen units are arranged in a straight line between support columns and the screens are flush with the columns. The line extends at a sharp angle across and downstream of the channel to a gate opening into a holding channel so that the intake stream from the watercourse approaches the screens at a sharp angle. The fish are unobstructed in moving sideward to avoid successively the several screens until reaching the gate which opens into a fish holding channel. Periodically the gate is closed and the fish are screened or flushed into the watercourse. Other suitable means of returning the fish to natural waters may also be provided. Both the travelling water screen units and the fish holding channel and return apparatus may be of whatever height is required to accommodate the fluctuations which must be expected in the water level of the watercourse.

BRIEF DESCRIPTION OF THE DRAWINGS

FIG. 2 is a side elevation of one of the travelling water screen units shown in FIG. 1.

FIG. 3 is an enlarged horizontal section taken on line 3—3 of FIG. 2 and shows the adjoining support columns in section.

DESCRIPTION OF THE PREFERRED EMBODIMENT

Figure 1:
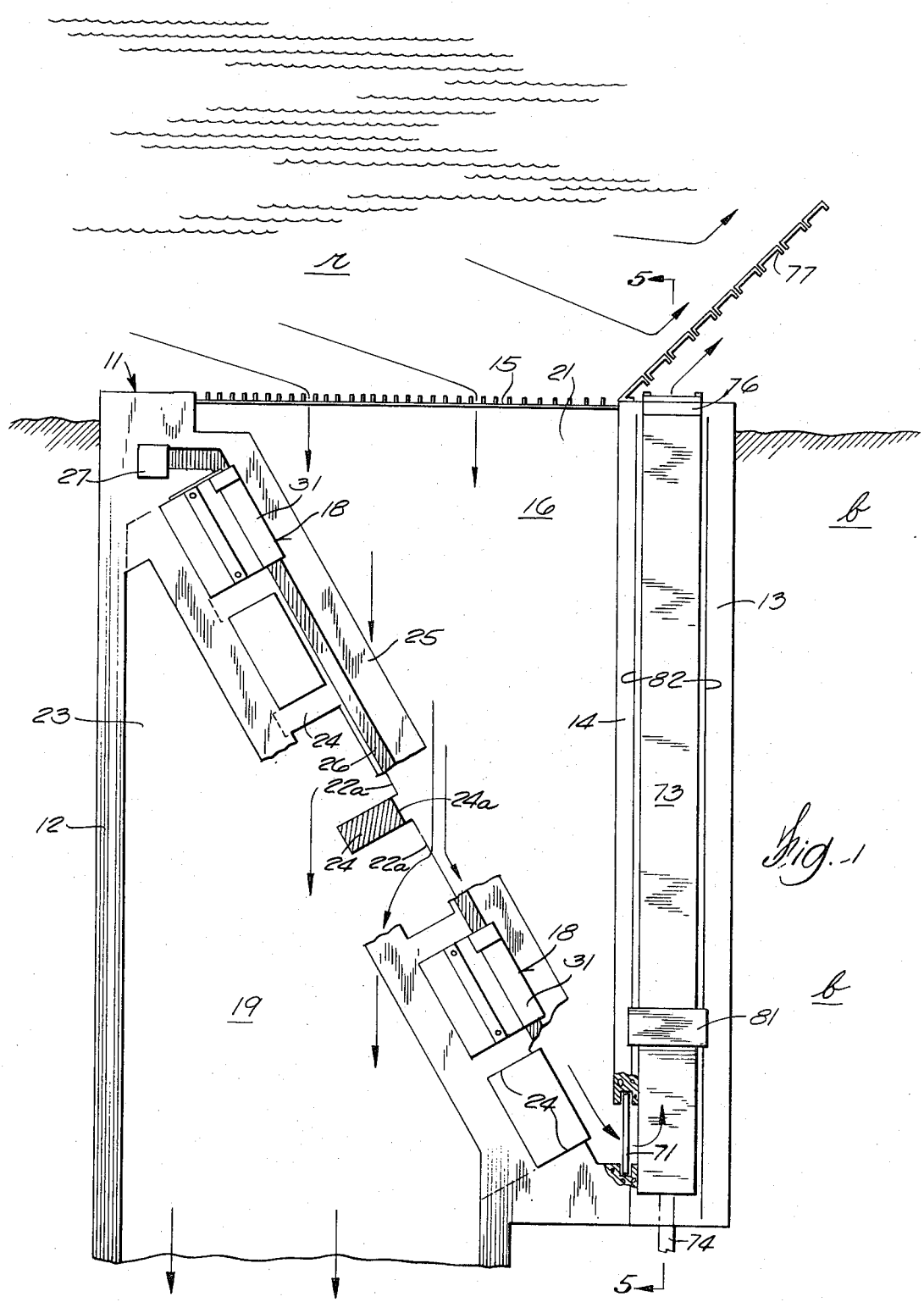
FIG. 1 is an overall plan of the water intake facility alongside a river. The concrete structure is broken away in part to show several support columns in section. Several of the travelling water screen units are removed to show the concrete structure for such screen units.
Figure 4:
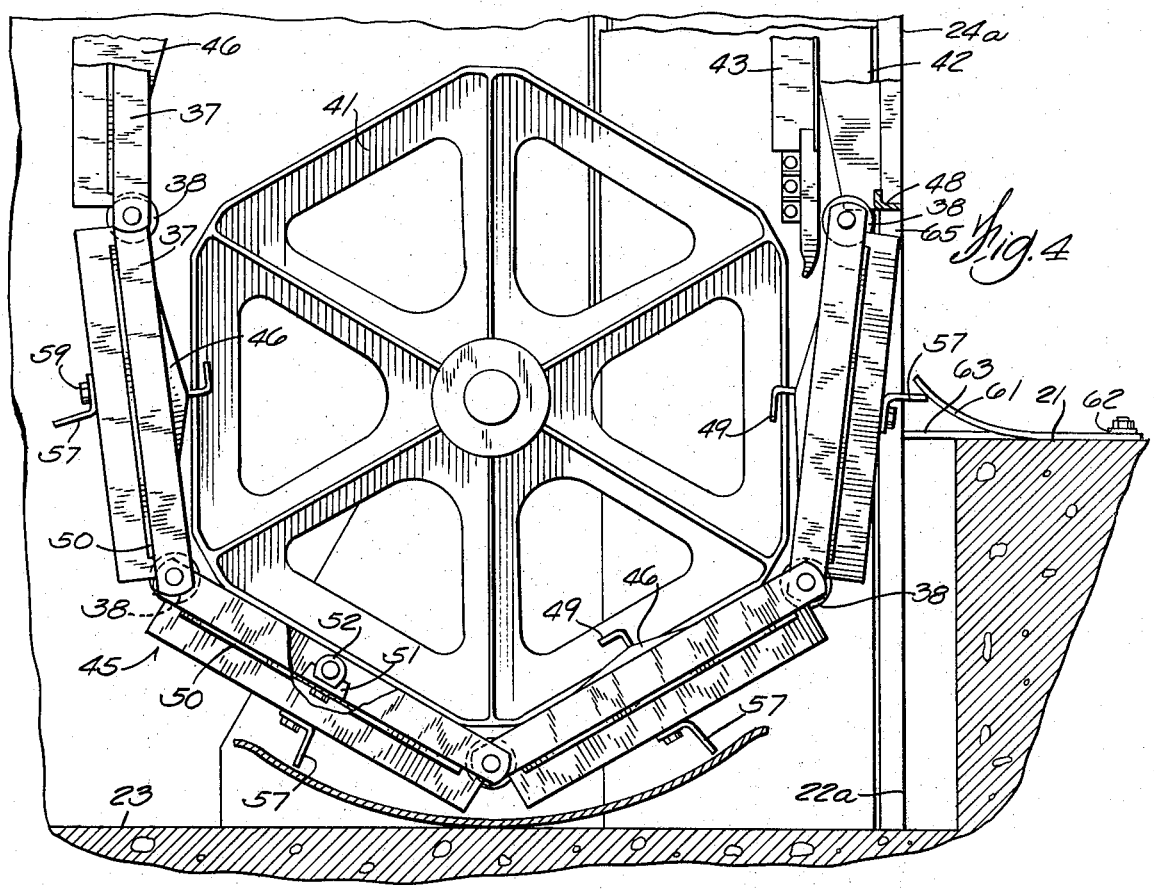
FIG. 4 is an enlarged side elevation of the lower end of the unit shown in FIG. 2 with parts broken away and sectioned to show details of the screens.

The concrete structure 11 in FIG. 1 is set in the bank b along the river r and includes the parallel side walls 12 and 13 and the divider wall 14. A coarse bar screen 15 at the river extends from wall 12 to divider wall 14 and excludes large objects from the entrance channel 16 and the screen units 18. The screened flow from units 18 is discharged into the exit channel 19.

The columns 24 between screen units 18 are set in a row which extends diagonally across the structure 11 from one end of wall 12 to the opposite end of wall 14. In the installation shown, the floor 21 of channel 16 is about two feet higher than the floor 23 of channel 19 such that there are downward steps 22a between columns 24. In plan, this step 22a is set something less than one foot ahead of the front faces 24a of the columns.

The several columns 24 support the concrete gallery or walkway 25 and the debris receiving trough 26 which empties into the sump 27 for collection and disposal in any suitable or conventional manner. Openings are provided in walkway 25 between support columns 24 for the several screen units 18 each of which includes an upper housing 31 and spaced upright support posts 32. Posts 32 rest on the floor between the adjoining columns and extend upwardly through the opening in walkway 25 to support the housing 31. Each screen unit 18 is lowered into place and for that purpose, the metal guides 34 are set in the opposite faces of the adjoining columns 24 to receive the oppositely projecting flanges of posts 32.

Each screen unit 18 includes parallel endless chains comprising links 37 which are provided with the intermediate guide rollers 38. A chain at each side of the unit operates over the upper driven sprocket 39 and moves downwardly at the rear of the unit to the lower wheel 41. The links 37 of the two chains pass under wheels 41 and as they move upwardly at the front side of the screen unit their rollers 38 enter the guideways between the forward inward-turned flanges 42 of posts 32 and the angle irons 43 welded to the inward facing sides of the posts.

A rectangular screen 45 is disposed between and carried at each end by the respective two corresponding links 37 of the two parallel chains of unit 11. Each screen 45 includes a rigid frame comprising the vertical end plates 46 which are joined at their upper and lower ends by the flanged upper and lower cross-members 47 and 48. The intermediate cross-brace 49 is also secured at its ends to the plates 46.

The frame of each screen 45 may be variously secured to the corresponding links 37. The preferred construction shown is also shown in expired U.S. Pat. No. 2,428,757 wherein each end plate 46 is provided with an outwardly projecting shelf plate 50 which overlies the corresponding link and includes a socket 51 which is bolted to the block 52 bridging the two sidebars of the link. Each screen frame is thus readily secured to and removed from the links by means of a single bolt, not shown, at each end of the frame.

The screening of each screen 45 comprises the series of vertical bars 55 which are disposed and supported vertically between the upper and lower cross-members 47 and 48. The bars 55 are supported against the flow by the intermediate cross-brace 49 and at their upper and lower ends by the flanges of the cross-members 47 and 48.

Each screen 45 includes a forward projecting shelf 57 which catches the debris falling from the upward moving screens above the shelf. Each shelf 57 is secured to the cross-brace 49 by bolts 59 extending between bars 55. The screens and shelves entering housing 31 are cleared of the debris by back-wash means 22 (comprising, for instance, a conventional header having forwardly directed apertures for the egress of water under pressure) located in the housing. At the same time the cleaned screens return downwardly at the rear of the screen unit. For that purpose, each screen unit 18 includes a motor driving the sprockets 39. Timed control means, not shown, may be readily employed to cause the motors of all of the units to operate for certain periods, or so that one or more screens units are cleaned in successive order.

It will be noted that the projecting shelves 57 of screens 45 may require a suitable provision for sealing the lower end of each screen unit. As shown, a flexible flapper seal 61 normally rests on floor 21 in front of the screen unit in vertically fixed relationship with the screens. A metal strip 62 secures one edge of seal 61 to the floor 21 and the other edge extends over the step 22a to the bars 55 and in the path of the shelves 57. The several seals 61 and intermediate rigid plates 63 secured to floor 21 provide the entire closure of the lower ends of the screen units at the front of the screen units 18 and columns 24.

Each screen unit 18 is installed between columns 24 so that the front edges of bars 55 are substantially flush with the front faces 24a of columns 24. The spaces between end plates 45 of the screens and the columns may be variously closed and sealed as required. As shown, the strips 65 are secured to the flanges 42 of posts 32 and are of wood or other suitable material so that screens 45 may slide on the strips because the flow in channel 16 will tend to push the screens sideward in one direction.

In the operation of the water intake facility as shown, the fish which have passed screen 15 will be carried with the flow to one of the screen units 18. Upon encountering a screen 45 and because of the angularity of the screen to the flow, each such fish will swim directly away from the screen but will be carried by the flow in a sideward direction toward the next screen, passing first the face of the intermediate column. The fish will successively pass all of the screen units similarly until reaching the last screen unit 18 and the gate 71 in wall 14 which opens into the inward end of channel 73 between walls 13 and 14. The maintenance of some flow past the last screen unit 18 referred to may be required and provided for such as from the channel 73 through the pipes 74 connected to the inward end of the channel. For that purpose, the entry to the pipes are screened and the pipes are connected to a suitable drain or pump, not shown.

The fish may be attracted through gate 71 as with a light placed in channel 73, but will generally find their way into the quiet water of the channel without difficulty and remain there until removed.

For that purpose, channel 73 extends along one side of the intake facility and the outward end of the channel at river r is normally closed by the gate 76 on the downstream side of piling 77. When the fish in the channel are to be returned to the river, the fish may be flushed from the channel with water delivered through the pipes 74 into the inward end of the channel.

Alternatively, as shown, the carriage 81 may be provided for operation on the parallel rails 82 fixed to the topsides of walls 13 and 14. The lower frame 83 suspended from carriage 81 forms or carries a grille which extends the width and height of the interior of the channel and while gate 71 is open and gate 76 is closed, carriage 81 and the grille is located out of the way at the inward end of channel 73 as shown in broken lines.

When the fish are to be removed from the channel, gate 71 is closed, gate 76 is opened and the carriage 81 moves the grille toward gate 71 and induces the fish toward that river. When the grille reaches gate 76, the gate is again closed, the carriage then returns to the inward end of the channel, and gate 71 is reopened.

The angularity of the row of screens relative to the flow and the velocity of the flow relative to the swimming speed of the fish are both critical to the operation of the facility. The flow velocity may be greater than the swimming speed of the fish but only to the extent that vectors representing direction and velocity of the flow and the direction and speed of the fish swimming away from the screens should form a right triangle. A flow velocity of one foot per second in channel 16 would be typical. Thus, the angle referred to would generally be in the order of 30° respecting the direction of flow.

Figure 5:
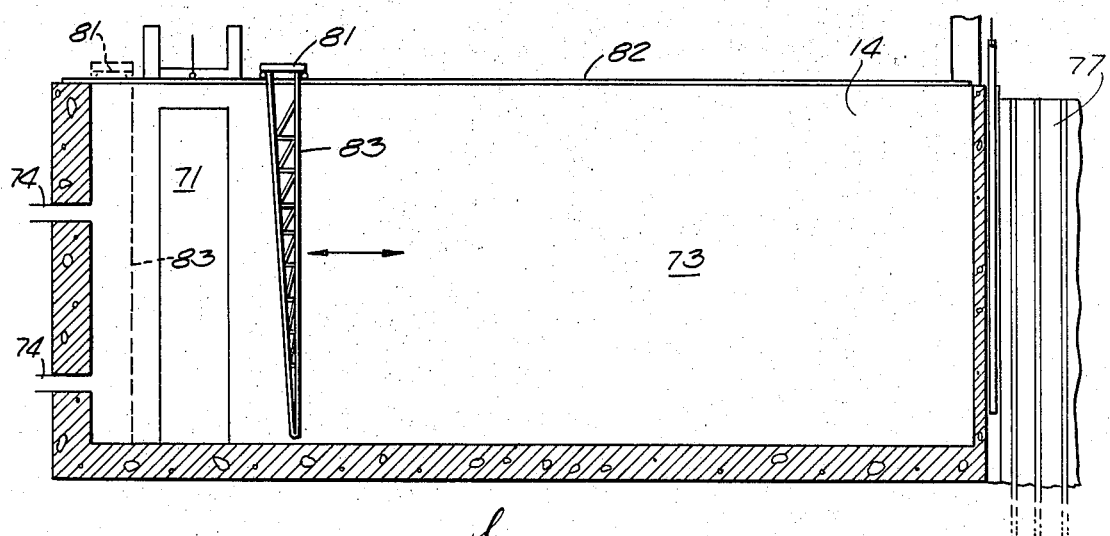
FIG. 5 is a longitudinal section taken on line 5—5 of FIG. 1 to show schematically the mechanism of the fish return channel.

With reference to the maintenance of some flow past the screen unit adjacent to gate 71, the screening of pipes 74 may be provided by the grille carried by the lower frame 83 of carriage 81 when the latter is "parked" as shown in broken lines in FIG. 5 between gate 71 and the pipes 74.

The intake facility such as for a power generating station requires screening of the flow such as with a woven wire screening having openings of as small as ¼ inch square. In some instances, woven wire may be sufficient for purposes of diverting the fish and the screens 45 with such woven wire might be employed.

Travelling water screens with such screening are used where the water level changes in height either seasonally or due to tides. Variations in height up to 50 feet are not uncommon and sufficient depth of the channel and height of the screen units must be provided. The intake facility as shown is generally intended to precede such travelling water screens and thus must accommodate the same considerable changes in water depth. The present invention is also particularly intended to utilize travelling water screen units similar to the conventional units which follow in the same intake system.

We claim:

1. A water intake structure comprising side walls forming a channel and spaced, rigid columns within the channel, a series of travelling water screen units supported by and between said columns, the forward faces of the screens of each unit being flush with the faces of the intermediate columns, said faces being arranged in a straight line extending at an angle across the channel and respecting the direction of flow approaching the screens, an opening in one channel wall where said line of screens meets said one wall at said angle, said angle being in the order of 30° so that the fish swimming away from the screens may be carried sideward by the flow in the one direction only which is toward said opening through which they may leave the channel, each screen having a rectangular frame, the frames of the screens of each unit being pivotally interconnected in an endless series, each travelling water screen unit further comprising a rotating drive means over which the series operates and from which the frames are suspended in the water intake channel and means for flushing debris from the upward run of the screens emerging from the channel;, the screen of each said unit comprising a series of laterally spaced vertical bars.

2. The structure of claim 1 wherein each travelling water screen unit has spaced vertical fixed sealing strips extending to the adjoining columns and the series of interconnected rectangular screen frames are disposed for upward movement between said strips, each frame having upright end plate members, each plate member being slidable on the respective strip to hold the screen against the sideward force which is due to the impingement of the water against the bars, said end plate members and strips being flush with the forward faces of said bars and columns.

3. The structure of claim 1 wherein said laterally spaced vertical bars are substantially flush with the front faces of said columns.

4. The structure of claim 1 wherein each of said travelling water screen units has a flexible flapper seal in vertically fixed relationship with the screens providing the entire closure of the lower ends of said travelling water screen units at the front of said screen units and said columns, each of said rectangular frames has vertical end plates and a forward projecting shelf for catching debris falling from the one of said screens above said shelf, each of said vertical end plates on the downstream side of each of said travelling water screen units is slidable on a strip provided to hold said screen units against the force of the water tending to push said screen units sideward in one direction, said vertical end plates and said strips are substantially flush with the front faces of said laterally spaced vertical bars and said columns, and said forward projecting shelf projects forwardly of said vertical end plates, said strips, and the forward faces of said laterally spaced vertical bars and said columns.

* * * * *

Disclaimer 3,868,324.—*Robert F. Taylor*, Milwaukee, *Donald A. Strow*, Hales Corners, and *Hosein Mansouri*, New Berlin, Wis. WATER INTAKE AND FISH RETURN SYSTEM. Patent dated Feb. 25, 1975. Disclaimer filed May 17, 1976, by the assignee, *Envirex Inc.*

Hereby enters this disclaimer to claims 1 and 3 of said patent.

[*Official Gazette July 6, 1976.*]